United States Patent [19]

Medelius et al.

[11] Patent Number: 5,734,596
[45] Date of Patent: Mar. 31, 1998

[54] SELF-CALIBRATING AND REMOTE PROGRAMMABLE SIGNAL CONDITIONING AMPLIFIER SYSTEM AND METHOD

[75] Inventors: Pedro J. Medelius, Merritt Island; Carl G. Hallberg, Cocoa; Howard J. Simpson, III, Melbourne; Stephen W. Thayer, Satellite Beach, all of Fla.

[73] Assignee: The United States of America as represented by Administrator National Aeronautics and Space Administration, Washington, D.C.

[21] Appl. No.: 624,152

[22] Filed: Mar. 29, 1996

Related U.S. Application Data

[63] Continuation-in-part of Ser. No. 233,583, Apr. 26, 1994, abandoned.

[51] Int. Cl.⁶ .................................................. G01R 35/00
[52] U.S. Cl. .......................... 364/571.01; 364/571.04; 330/295; 330/51; 330/124 R
[58] Field of Search ........................ 330/124 R, 295, 330/51; 364/571.01, 571.03, 571.04, 550, 551.01; 475/65, 116, 61; 341/110, 118–120, 141; 370/532, 537, 538; 340/870.04, 870.11–870.13; 324/130; 73/1 R, 1.01, 1.11, 1.59; 318/618

[56] References Cited

U.S. PATENT DOCUMENTS

| | | | |
|---|---|---|---|
| 3,633,202 | 1/1972 | Kuckein et al. | 341/120 |
| 3,940,759 | 2/1976 | Zitelli et al. | 370/532 |
| 4,044,353 | 8/1977 | Levy | 342/124 |
| 4,121,055 | 10/1978 | Doherty | 370/503 |
| 4,390,949 | 6/1983 | Beningfield et al. | 364/429 |
| 4,590,472 | 5/1986 | Benson et al. | 340/870.04 |
| 4,626,769 | 12/1986 | Valley et al. | 323/283 |
| 4,700,174 | 10/1987 | Sutherland et al. | 341/120 |
| 4,872,213 | 10/1989 | Sebald et al. | 364/180 |
| 4,896,155 | 1/1990 | Craiglow | 341/120 |
| 4,926,360 | 5/1990 | Sprink, Jr. | 364/571.01 |
| 5,089,979 | 2/1992 | McEachern et al. | 364/571.04 |
| 5,132,917 | 7/1992 | Bass | 364/510 |
| 5,138,280 | 8/1992 | Gingrich et al. | 330/295 |
| 5,157,348 | 10/1992 | Deveau | 330/279 |
| 5,191,327 | 3/1993 | Talmedge et al. | 340/870.38 |
| 5,229,700 | 7/1993 | Stitt et al. | 318/618 |
| 5,255,975 | 10/1993 | Adams | 374/1 |
| 5,262,716 | 11/1993 | Gregory, Jr. et al. | 324/754 |
| 5,297,423 | 3/1994 | Keating et al. | 73/49.2 |
| 5,361,218 | 11/1994 | Tripp et al. | 364/571.01 |
| 5,396,241 | 3/1995 | Ames et al. | 341/100 |
| 5,444,644 | 8/1995 | Divjak | 364/550 |
| 5,450,336 | 9/1995 | Rubsamen et al. | 364/571.01 |
| 5,463,349 | 10/1995 | Petersen et al. | 330/51 |
| 5,500,644 | 3/1996 | Denjean et al. | 341/120 |
| 5,519,644 | 5/1996 | Benton | 364/571.01 |

*Primary Examiner*—James P. Trammell
*Assistant Examiner*—Hal D. Wachsman
*Attorney, Agent, or Firm*—Beth A. Vrioni

[57] ABSTRACT

A self-calibrating, remote programmable signal conditioning amplifier system employs information read from a memory attached to a measurement transducer for automatic calibration. The signal conditioning amplifier is self-calibrated on a continuous basis through use of a dual input path arrangement, with each path containing a multiplexer and a programmable amplifier. A digital signal processor controls operation of the system such that a transducer signal is applied to one of the input paths, while one or more calibration signals are applied to the second input path. Once the second path is calibrated, the digital signal processor switches the transducer signal to the second path, and then calibrates the first path. This process is continually repeated so that each path is calibrated on an essentially continuous basis. Dual output paths are also employed which are calibrated in the same manner. The digital signal processor also allows the implementation of a variety of digital filters which are either proprogrammed into the system or downloaded by an operator, and performs up to eighth order linearizations.

30 Claims, 3 Drawing Sheets

SELF-CALIBRATING AND REMOTE PROGRAMMABLE SIGNAL CONDITIONING AMPLIFIER SYSTEM AND METHOD

CROSS-REFERENCE TO RELATED APPLICATIONS

The present application is a continuation-in-part of application Ser. No. 08/233,583, filed Apr. 26, 1994, and entitled "Data Acquisition Control and Remote Programmable Amplifier System and Method", which is now abandoned.

ORIGIN OF THE INVENTION

The invention described herein was made in the performance of work under a NASA contract and is subject to the provisions of Public Law 96-517 (35 USC 202) in which the contractor has elected not to retain title.

BACKGROUND OF THE INVENTION

The present invention relates in general to a signal conditioning amplifier system and method for use with measurement transducer signals which is both self-calibrating and remotely programmable.

Monitoring remote physical events, such as temperature, vibration, acceleration, fluid flow and material deformation, often requires remote amplification and signal processing so that electrical signals generated by measurement transducers may be reliably transmitted to a centralized data acquisition system. To perform these functions properly, devices in such remote systems must be calibrated according to the characteristics of the particular transducer used.

For example, different transducers require excitation signals of different types or levels. Because various transducers produce output signals of varying ranges, amplifier gain must also be adjusted for each transducer so that the resulting signal falls within an acceptable range for downstream signal processing and outputting to the central system. Similarly, output signal non-linearity and noise are typically transducer-specific. Transducer characteristics, therefore, must be known in order to process their signals properly.

The need to recalibrate a remote data acquisition system at each transducer installation is a multi-faceted problem. The NASA Kennedy Space Center's (KSC) Permanent Measurement System exemplifies the difficulties encountered when such a system must be used with many types of transducers. The Permanent Measurement System, maintained and operated by the Shuttle Processing Contractor (SPC), acquires environmental and special measurement data relating to, for example, temperature, pressure, vibration, wind speed, shock and acceleration during shuttle launches and tests at the Space Center's Launch platforms and Launch Equipment Test Facility. The system is comprised of transducers at the launch and test sites and signal processing equipment including signal conditioning amplifiers and PCM telemetry equipment located inside pad terminal rooms, mobile launch platforms and instrument vans.

In the NASA KSC Permanent Measurement System, various transducers may be needed, including for example, thermometers, acceleration meters, speed meters, pulse-type flow meters, frequency output sensors and A/C phase measurement transducers. Each transducer requires its own associated signal processing equipment, which must be physically matched to the operating characteristics of the individual transducer. However, as noted above, output signal level, non-linearity and noise are transducer-specific. Thus, the degree of amplification and signal processing required is also transducer-specific, resulting in individual signal processing requirements for plural respective devices.

In particular, the integral components of the existing NASA system require an extensive amount of time and manpower for installation, measurement calibration, set-up and verification whenever a new transducer is installed. System configuration, including channel number, measurement number and set-up characteristics, must be manually obtained, entered and updated. Delays additionally arise when a filtering change is desired, even when no transducer change is made, thereby requiring reconfiguration of signal conditioners. Furthermore, a failed measurement (i.e., any mechanical or electrical failure involving any component related to an individual transducer) requires the entire installation, calibration, set-up and verification process to be repeated.

Also problematic is the distance, necessary because of the heat generated during launches and tests, between the system's integral components and the actual transducers. Many such components are several hundred feet away, and any form of electrical noise or interference along the relatively lengthy cable runs can significantly deteriorate the total performance of the measurement system. Additionally, individual cable paths must be maintained between each transducer and an external measurement system. Because cable configuration mistakes likely result in scrambled signals, careful quality control and verification methods are required.

Furthermore, analog signal conditioning amplifiers suffer a degradation of performance when subject to temperature changes and/or normal aging of the circuitry. High accuracy signal conditioning amplifiers are usually specified for laboratory use under controlled environmental conditions such as temperature and humidity, and are guaranteed to perform within specifications after a reasonable warmup. Auto-calibration procedures are available where a signal conditioning amplifier is subject to a reference voltage so that its gain can be calibrated, and its zero offset removed. This is done immediately after power up, after a gain change or at predefined intervals. Signal conditioning amplifiers used at field installations where the external temperature can vary from sub-zero° C. to over 70° C. require self-calibration at frequent intervals in order to maintain the required accuracy. In addition, if the signal conditioning amplifier must provide excitation voltage to a transducer connected to it, this voltage must also be accurately maintained so that the performance of the transducer is not degraded.

In order to maintain a high accuracy (e.g., better than 12 bits), each stage of a signal conditioning amplifier (amplifiers with high gains could have more than one stage) must be calibrated. Interlacing a reference voltage and a reference zero with the signal to be amplified can provide a means for self-calibrating. An A/D converter could be used to convert the reference voltage, the zero volt offset and the signal of interest into a digital form so that a microprocessor can be used to compensate for any drifts in gain and/or offset that might have occurred. However, an accurate calibration can only be obtained if the settling time of the amplifier stages is fast enough to allow the reference voltage to reach the ideal output within the resolution and accuracy required (e.g., one part in 65536, for 16-bits). The settling time is limited by the bandwidth of the amplifier stages, where the larger the bandwidth, the faster the settling time. However, an increased bandwidth also results in an increase in the noise going through and generated by the amplifiers, thus limiting the accuracy of the system. Furthermore, a large bandwidth could possibly cause aliasing problems.

Conversely, a limited bandwidth would maintain the noise within a low level, but would prevent the reference voltage from providing an accurate reference due to the slower settling time. As a result of these competing concerns, it has been very difficult until now to maintain high accuracy in a signal conditioning amplifier through use of auto calibration procedures where the amplifier is exposed to widely varying environmental conditions necessitating frequent recalibration.

SUMMARY OF THE INVENTION

The present invention addresses the foregoing problems by providing a self-calibrating and remotely programmable signal conditioning amplifier system and method for processing transducer signals, or the like, which enables a high accuracy calibration to be performed without requiring an increased signal bandwidth. More particularly, the amplifier system employs a dual path input for simultaneous reception of transducer measurement signals and calibration signals. Each path includes its own programmable amplifier whose gain is adjustable by a controlling means, preferably a digital signal processor, to maintain proper calibration, and a switching circuit, such as a multiplexer, that is controlled by the digital signal processor, and selectively applies either the transducer output signal or one of a number of calibration test signals as input to that path's corresponding programmable gain amplifier. The switching circuits are controlled in such a manner that while calibration signals are applied to one path, the transducer signal is applied to the other path. In this manner, calibration of each programmable gain amplifier can be repeatedly performed on a frequent basis (e.g., every second or less) without interruption of transducer signal processing, and without requiring a fast settling time for each calibration signal, thus permitting use of a limited bandwidth. Since the calibration of each programmable amplifier is checked and adjusted so frequently, high accuracy can be maintained, even when the system is exposed to rapidly varying environmental conditions.

The signal conditioning amplifier system is also specifically designed to be employed with measurement transducers having memory means associated therewith for storing calibration and transducer identification data specific to the corresponding transducer. Preferably, this data includes transducer excitation range data, transducer output signal filter and amplifier setup data, and transducer calibration data. The transducer's memory means communicates this data to the signal processor which employs the data to control the gain of the system's programmable amplifiers, thus providing proper conditioning of the transducer's output signal.

BRIEF DESCRIPTION OF THE DRAWINGS

The advantages and features of the present invention will become apparent from the following detailed description of preferred embodiments thereof, taken in conjunction with the accompanying drawings, in which.

DETAILED DESCRIPTION OF THE PREFERRED EMBODIMENT

Figure 1:
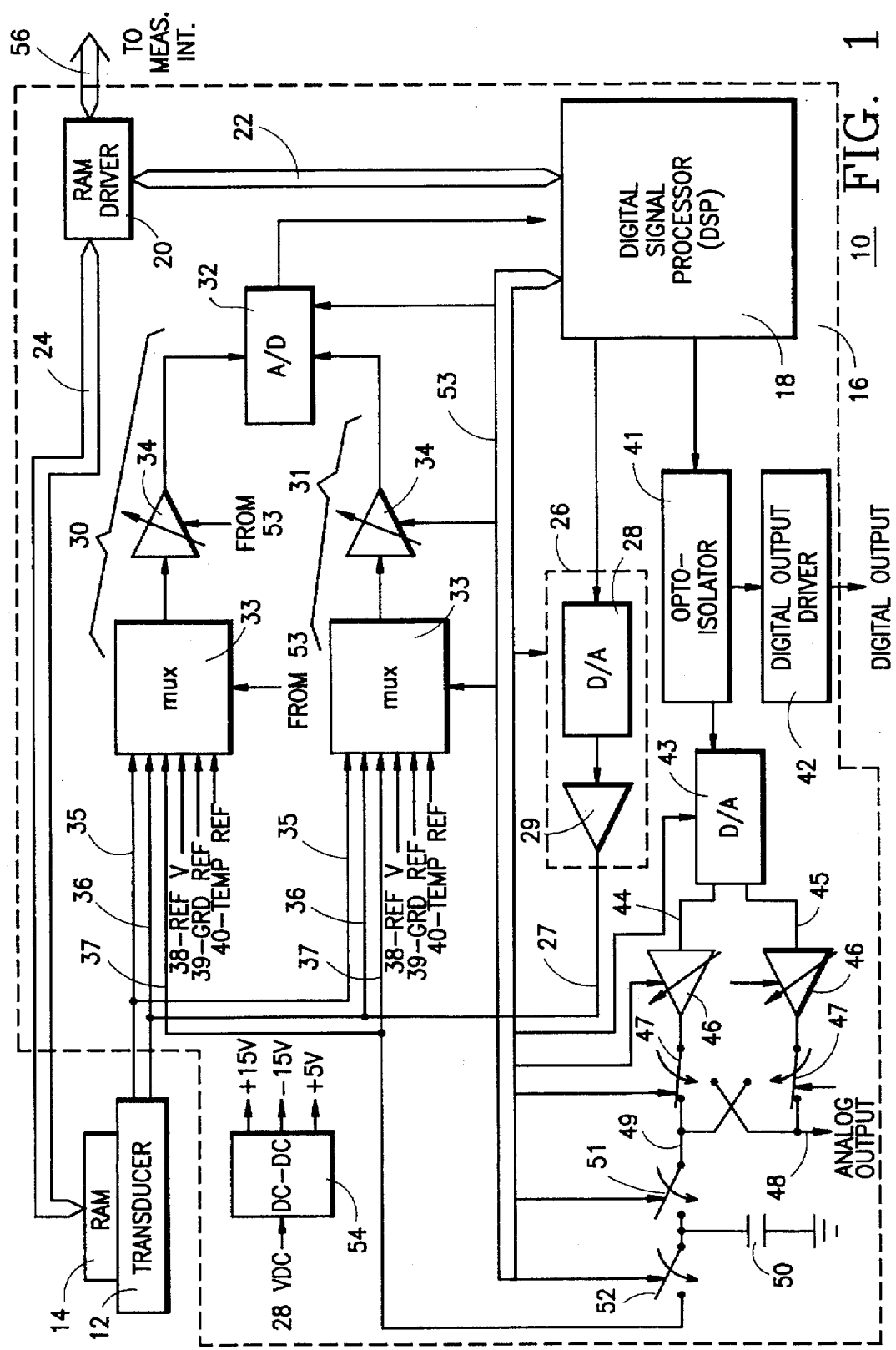
FIG. 1 is a block diagram of a first preferred embodiment of the present invention comprising a self-calibrating and remote programmable amplifier and transducer system including a Universal Signal Conditioning Amplifier (USCA) and an associated transducer.

FIG. 1 illustrates a first preferred embodiment of the present invention comprising a self-calibrating and remote programmable amplifier and transducer system 10, including a transducer 12 with a memory 14 (preferably a random access memory or RAM) and a Universal Signal Conditioning Amplifier (USCA) 16 in communication with a measurement interface as indicated. In this embodiment, the RAM 14 preferably comprises a relatively small nonvolatile device capable of being retrofit in the housing of the transducer 12, or which is part of a "pig-tail" cable adapter specific to a transducer, as is known in the art, and is sealed to the transducer 12 after calibration.

In the preferred embodiment, the RAM 14 is loaded with information data pertaining to the transducer 12 at the time of, for example, the transducer's calibration. As is known in the art, transducers vary in the level of their output signals and in output signal filter requirements. Additionally, they typically produce non-linear output responses to input signals. Data pertaining to excitation range, amplifier gain, filter settings and linearization coefficients is therefore needed in order to properly operate the transducer and process its output signals. This data is generally available from the transducer's manufacturer.

Although the storing of this specific data in the RAM 14 is within the scope of the present invention, it is recognized that this list of information is neither a requirement nor a limitation thereto. For example, the RAM 14 can also store transducer identification data, allowing, as discussed below, custom filter design for specific transducers. Additionally, password protection of the RAM 14 is preferably provided to prevent inadvertent data modification.

Upon start-up of the system 10, the USCA 16 is preferably automatically calibrated in response to the data contained in the RAM 14. A digital signal processor (DSP) 18 is employed as a controlling means for calibrating the USCA 16 in response to the data in the RAM 14. This data is read into the DSP 18 through a RAM driver 20, and first and second bidirectional communication/control lines 22 and 24. The DSP 18 controls excitation of the transducer 12 through an excitation means or module 26. The excitation means or module 26 generates an excitation signal which is supplied to the transducer 12 through a communication line 27. Preferably, the excitation module 26 is comprised of a voltage/current source (providing, in this embodiment, up to 30V or 100 mA) which includes a first, preferably 16 bit, digital to analog (D/A) converter 28 and an amplifier 29.

The USCA 16 incorporates first and second analog signal input paths or channels 30 and 31, both of which direct analog signals as input to an A/D converter 32. Each of the signal paths 30 and 31 includes, in series, a corresponding one of a pair of multiplexer circuits 33 and a corresponding one of a first pair of programmable gain amplifiers 34 comprising the input stage of USCA 16.

As illustrated, each of the multiplexer circuits 33 receives a plurality of input signals. These include a transducer signal input 35 connected to the output of the measurement transducer 12, and a plurality of calibration inputs. The calibration inputs include an excitation voltage input 36 used to monitor the positive and negative voltages applied to the transducer 12 by the excitation module 26; an output calibration input 37 which is used to calibrate the gain of the USCA's output stage amplifiers (to be discussed in greater detail below) to remove any voltage offset; a reference voltage input 38 used for calibrating the input gain of each of the programmable amplifiers 34; a zero volt or ground reference input 39 used to remove any DC voltage offsets; and, a temperature reference input 40 used to compensate for the thermocouple effect at an input connector (not shown) of the USCA 16.

The digital output of the A/D converter 32 is input to the DSP 18 which processes the amplified and digitized transducer signal. The processed and amplified transducer signal is output from the DSP 18, preferably through a conventional opto-isolator 41, to a digital output driver 42 and the input of a second D/A converter 43. The purpose of the opto-isolator 41 is to assure complete galvanic isolation between the DSP 18 and both the digital output driver 42 and D/A converter 43, thereby eliminating ground loops between these elements.

First and second outputs 44 and 45 from the second D/A converter 43 provide a dual path output for the USCA 16 in addition to the dual path input. The outputs 44 and 45 are each input to a corresponding one of a second pair of programmable gain amplifiers 46 which comprise the output stage of the USCA 16. A first pair of solid state relays 47 selectively connect the programmable gain amplifiers 46 either to an analog output 48, or to an output calibration path 49.

In order to maintain an electrical isolation between the output stage and the input stage of the USCA 16, the output calibration signals are transferred to the calibration inputs of the multiplexers 33 by means of a capacitor 50 which is switched in and out of the circuit by means of third and fourth solid state relays 51 and 52. The third and fourth solid state relays 51 and 52 are employed to provide an isolation greater than 10 Gigohms at 2500 volts, and are controlled by the DSP 18 to insure that they are never both turned on at the same time.

The remaining elements in FIG. 1 are conventional, and include a control bus 53 that connects the DSP 18 to each of the various circuit elements in the USCA 16 to facilitate control thereof by the DSP 18, and a DC-DC converter 54 which receives a 28 VDC input 55, and converts it to +5 VDC, +15 VDC and −15 VDC for supplying power to all of the USCA's circuit elements. Finally, a bidirectional communication/control line 56 connects the RAM driver 20 to a measurement interface (not shown).

In the operation of the USCA 16, the multiplexers 33 initially connect the output of the transducer 12 to the first programmable gain amplifier 34 in the first input path 30, while the various calibration inputs are applied to the other programmable gain amplifier 34 in second path 31. The second amplifier 34 in the second path 31 is then sequentially excitated with the excitation voltages, and various references at a rate which allows enough time for the second amplifier 34 to settle to within one part in 65536 of its final voltage, this being the accuracy required for 16 bit resolution. The DSP 18 samples data from each of the paths 30 and 31 separately, and uses the data obtained from the second path 31 to calibrate the second amplifier 34. At the same time, the transducer data is processed through the first path 30. In the preferred embodiment, the time required for fully calibrating each of the programmable gain amplifiers 34 is less than a second.

Once the second amplifier 34 in the second path 31 is fully calibrated, that path's corresponding multiplexer 33 is switched to the input 35 from the transducer 12. At this time, both of the paths 30 and 31 are carrying the transducer signal. After allowing enough time for stabilization of the second amplifier 34 in the second path 31 that was previously used for calibration, the first amplifier 34 in the first path 30 is switched to the calibration inputs by that path's multiplexer 33. The process is then repeated so that the calibration factors of both of the amplifiers 34 in the paths 30 and 31 are updated on a virtually continuous basis without interruption of transducer data processing.

The two outputs 44 and 45 from the second D/A converter 43 are also calibrated in a similar manner. While the first output 44 is carrying the analog output signal of the USCA 16, the second output 45 carries either a reference voltage or a reference zero that is generated by the DSP 18, and is fed back through one of the input paths 30 or 31. Again, the same process as before is employed wherein, after the second output 45 is calibrated, the relays 47 are switched to connect both outputs to the analog output 48 for a brief period of time while the output that was just calibrated is allowed to settle. The outputs are then switched so that the first output 44 is calibrated, and so on. This process facilitates calibration of the D/A converter 42 and the output filtering stage and second pair of programmable gain amplifiers 46.

The output signal produced by the transducer 12 is amplified by the selected one of the programmable gain amplifiers 34 in response to set-up instructions from the DSP 18. It would be expected for this preferred embodiment that amplifier gain requirements range between 0.25 and 2048 V/V. The DSP 18 provides real-time digital filtering and linearization of the digital signal emerging from the A/D converter 32.

With respect to existing transducers at NASA's Kennedy Space Center, linearization through up to eighth-order polynomials is desirable. Thus, in the preferred embodiment, eighth-order coefficients are stored in the RAM 14. It should be understood, however, that differing orders of polynomials may be used as needed for particular installations or embodiments. Furthermore, filters may be employed as required by individual transducers, including various high-pass, low-pass, band-pass or notch filters. All such "customizing" for a particular embodiment may be practiced by those of ordinary skill in the art, within the broader aspects of the subject invention.

As indicated above, the USCA 16 has been designed for use at NASA's Kennedy Space Center's launch platforms and Launch Equipment Test Facility. Such circumstances involve placing the USCA 16 near its associated transducer 12 to prevent signal degradation, which in turn requires that it be able to withstand the same extreme temperatures and vibrations to which the transducer 12 is exposed. Therefore, the USCA 16 is preferably encased within a rugged, explosion-proof environmental housing (not shown). While many acceptable constructions of the housing are possible, it preferably comprises an aluminum housing, capable of withstanding 100 G, 1 kHz vibrations. Because all calibration parameters of the USCA 16 can be loaded electronically from the RAM 14 into the DSP 18 after assembly and calibration, there is no need to open the housing once it has been sealed. It is understood to be within the scope of the present invention, however, that certain alternative uses of the USCA 16 may not require such a particular sealed housing embodiment. Less substantial embodiments may suffice, or be preferable, in certain embodiments. Because of particular space restrictions at Kennedy Space Center launch and test sites, small outline integrated circuit packages as are known in the industry are employed in this embodiment. The housing may range, therefore, from three to four inches in diameter and six to eight inches in length.

Although the above discussion concerns automatic system calibration, the potential for operator interaction is also included within the scope of the subject invention. Specifically, the bidirectional communication/control line 56 associated with the measurement interface enables the override (by an operator) of data stored in the RAM 14 through the RAM driver 20. This allows real-time customized filter and linearization adjustments whenever needed. Additionally, the bidirectional communication/control line 56 allows the operator to monitor the operating status of any USCA within a multiple transducer data acquisition and control and programmable amplifier system, and to track individual transducers after their installation.

Figure 2:
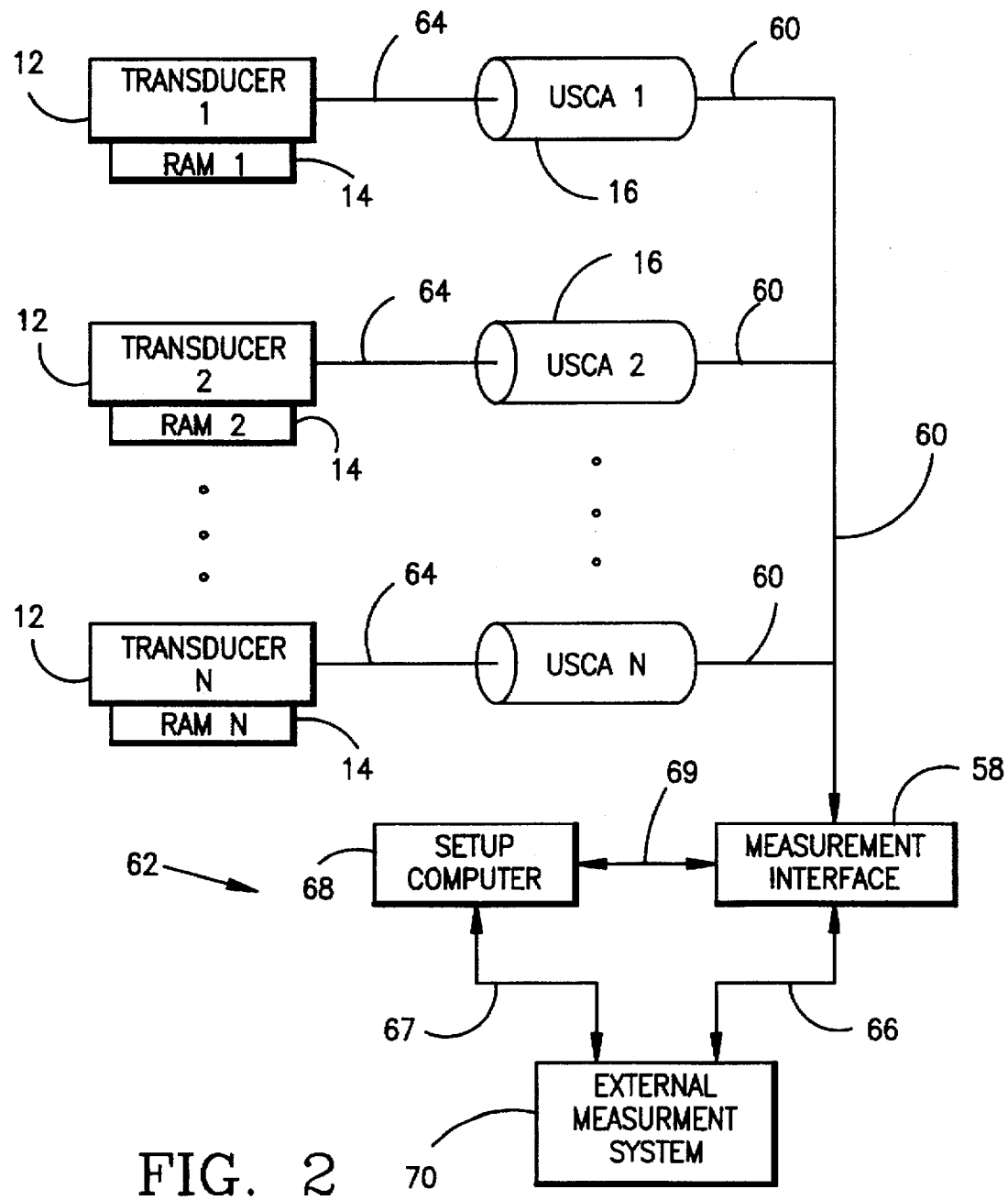
FIG. 2 is a block diagram of a system comprised of a series of the transducers and Universal Signal Conditioning Amplifiers of FIG. 1.

A plurality of the self-calibrating and remote programmable amplifier and transducer systems 10 of FIG. 1 can be incorporated into a multiple transducer system 62 as illustrated in FIG. 2. More particularly, FIG. 2 illustrates a plurality of N USCAs 16 and a corresponding plurality of N transducers 12 and RAMs 14. Each of the USCAs 16 acts as a separate input channel to the system 62, and these communicate with an external measurement 70 via a measurement interface 58, a setup computer 68 and a plurality of communication/control lines 60, 66, 67 and 69. The measurement interface 58 in the setup computer 68 provides supervisory control, connect/disconnect status and time for all channels, and system information for all active channels. (An active channel is any channel in which its corresponding USCA 16 is connected to a transducer 12 via a control line 64.) Additionally, the measurement interface 58 in the setup computer 68 provides an operator with the capability of downloading USCA-specific control information, for example, filter data or output unit scale information, to each USCA 16 on a channel-by-channel basis.

The setup computer 68 also controls communication and routing of measurement data collected by the transducers 12 to the external measurement system 70. The setup computer 68 is capable of identifying each transducer 12 by its associated RAM 14, and is thus capable of routing measurement information from an individual transducer 12 to a desired output channel of the external measurement system 70, regardless of the input channel or USCA 16 to which the individual transducer 12 is connected. Therefore, cable switching at test sites does not necessitate system reconfiguration. It should be noted, however, that the external measurement system 70 could be comprised of discrete measurement devices, such as recorders, wherein input channels from the USCA's 16 would be routed directly to these devices through the measurement interface 58.

It should also be understood that the measurement interface 58, the setup computer 68 and external measurement system 70 may be comprised of various hardware and software configurations. For example, the setup computer 68 may comprise a computer including a multichannel device, and the external measurement system 70 may comprise a software program. Such a configuration permits real time monitoring, display and recording of input/output channel status. Alternatively, the setup computer 68 and the external measurement system 70 may comprise separate, discrete devices of varying types as understood in the art.

It is also to be understood by those of ordinary skill in the art that the communication/control lines 60 collectively represent information flow, not necessarily individual output communications lines as depicted in FIG. 1. Similarly, the communication/control lines 64 represent information flow between the USCA's 16 and the transducer 12/RAM 14 combinations as depicted in FIG. 1. Furthermore, because cable runs represented by the communication/control line 66 may require that cable segments be used, it is contemplated to be within the spirit and scope of the present invention that distinct cable segments could be provided with individual memory devices so that an operator, through measurement interface 58 or similar means, could identify and trace active cable segments.

Figure 3:
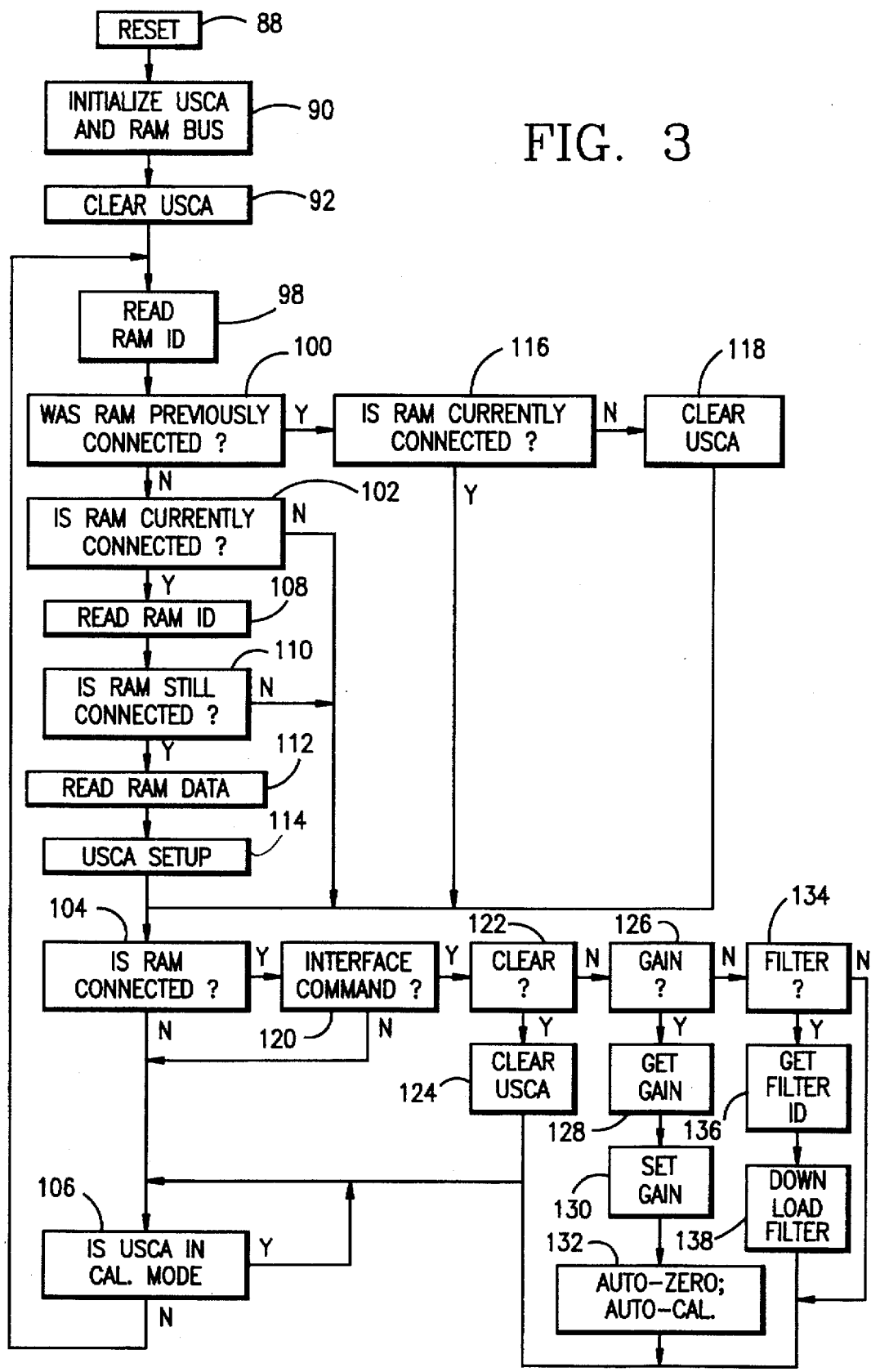
FIG. 3 is a flow chart illustrating the operation or methodology of the preferred embodiment of the present invention.

FIG. 3 illustrates a flow chart depicting the operation of the preferred embodiment of the present invention with respect to a single transducer and corresponding USCA. Initially, the USCA 16 (as in FIG. 1) is reset at step 88 upon any power-up event. Upon reset, all input, output and control ports are initialized, and all internal data and control values are initialized to default values at step 90. In step 92, the DSP 18 clears the USCA 16, zeroing internal RAM buffers and the excitation module 26, and setting default gains and output ranges. At such point, the USCA 16 is operational and may process output signals from the transducer 12.

After these initialization steps, the DSP 18 may read identification data from the RAM 14 during step 98 and determine during step 100 whether the subject RAM 14 has been newly installed, and specifically determine whether it was previously connected. If the RAM 14 was not previously connected, then DSP 18 determines during step 102 whether the RAM 14 is currently connected. If the RAM 14 has been disconnected, the DSP 18 confirms such disconnect during step 104.

If the disconnect is again indicated by step 104, a check is made for calibration mode status at step 106. Under the calibration mode for the preferred embodiment depicted in FIG. 1, a shunt resistor (not shown) may be placed across the output of the transducer 12. Such placement may be practiced by means of a relay (not shown) triggered by an operator via the measurement interface 58. The shunt resistor may be chosen for simulating a condition which would result in, for example, an expected eighty percent response from the transducer 12. Any deviations from the expected response would indicate needed corrections, which could be implemented through operator commands, such as described below.

A calibration mode control sequence is not separately indicated in FIG. 3. As will be understood by those of ordinary skill in the art from the description above, the calibration mode may be initialized remotely by operator command. If the USCA 16 is in its calibration mode, the DSP 18 will repeatedly check calibration mode status at step 106 until the operator terminates the calibration mode. At such point, the RAM identification data will be read at step 98.

If it is determined at step 102 that the RAM 14 is still connected, the DSP 18 confirms the RAM identification and connection at steps 108 and 110, respectively. If connection of the RAM 14 is confirmed, the DSP 18 reads data from the RAM 14 at step 112 and completes setup of the USCA 16 during step 114. In the preferred embodiment, USCA setup comprises, in response to the data contained in the RAM 14, setting excitation configuration, loading linearization coefficients, configuring analog input, setting amplifier gain, setting output range, and loading a digital filter to the DSP 18.

If during step 100, it is determined that the RAM 14 has been previously connected, the DSP 18 confirms such connection during step 116. At such point, the USCA setup procedure will have previously taken place and the USCA 16 will be properly configured. Therefore, operation of the DSP 18 advances to step 104. If the RAM 14 has been disconnected as indicated by the determination during step 116, the USCA 16 is cleared during step 118, and again operation of the DSP 18 advances to step 104.

If per the determination of step 104, the RAM 14 is disconnected, operation of the DSP 18 advances to step 106, as described above. If the RAM 14 is connected, the existence of interface commands is determined during step 120. If interface commands are present, the DSP 18 looks during step 122 for a clear command. If a clear command is determined to be present by step 122, the USCA 16 is cleared during step 124. If there is no clear command, the existence of a gain command is checked during step 126. If a gain command is found to be present, the amplifier gain is downloaded during step 128 and set during step 130.

During step 132, zero offset and gain drift are determined and compensation coefficients are calculated and implemented. On the other hand, if no gain command is found to be present, the DSP 18 checks for a filter command during step 134. If a filter command is found to be present, the filter identification data is read during step 136 and the corresponding filter data is downloaded during step 138. In the preferred embodiment, filter identification data identifies precompiled filters stored in the DSP 18. If needed, customized filters may be compiled at, for example, the external setup computer 68 as in FIG. 2, downloaded to the DSP 18 through the measurement interface 58, and then called for downloading to the DSP 18 during step 134. If no interface commands are found, or if the interface command is completed, operation of the DSP 18 advances to step 106.

In summary, the dual path arrangement of the USCA 16 enables continuous self-calibration without the requirement of fast settling times in the USCA's components. As a result, a limited signal bandwidth can be employed which improves the signal-to-noise ratio of the system. Further, the continuous self-calibration provides the ability to respond quickly to component parameter variations resulting from rapidly changing environmental conditions so that high accuracy can be maintained in such conditions. Finally, the use of the RAM 14 associated with the transducer 12 which contains transducer identification, calibration and other data, enables the USCA 16 to calibrate itself automatically upon start up to any transducer connected thereto. This feature is particularly advantageous in that it eliminates the necessity for manual entry of the transducer data into the USCA's processor.

Although the invention has been disclosed in terms of a preferred embodiment and variations thereon, it will be understood that numerous additional variations and modifications could be made thereto without departing from the scope of the invention as defined in the following claims.

What is claimed is:

1. A signal conditioning amplifier system comprising:
   a) first and second signal input paths;
   b) a first amplifier disposed in said first path;
   c) a second amplifier disposed in said second path;
   d) first switching means for selectively applying either a signal to be amplified or at least one calibration signal to said first and second amplifiers; and
   e) means for controlling said switching means to cause said signal to be amplified to be applied to 1) said first amplifier, while a calibration signal is applied to said second amplifier, and 2) said second amplifier, while a calibration signal is applied to said first amplifier; whereby, said second amplifier can be calibrated while said signal to be amplified is amplified by said first amplifier, and said first amplifier can be calibrated while said signal to be amplified is applied to said second amplifier.

2. The system of claim 1, wherein said first switching means further comprises first and second multiplexers.

3. The system of claim 2, wherein said first and second multiplexers each include a transducer signal input and a plurality of calibration signal inputs.

4. The system of claim 3, wherein said plurality of calibration signal inputs comprises a transducer excitation signal input; a system output calibration input; and at least one reference voltage input.

5. The system of claim 1, wherein said means for controlling comprises a digital signal processor.

6. The system of claim 5, wherein said first and second amplifiers are programmable gain amplifiers that are controllable by said digital signal processor.

7. The system of claim 6, wherein said digital signal processor comprises means for processing and outputting an inputted amplified and digitized signal, and said system further comprises a D/A converter for converting said digitized output signal into an analog output signal.

8. The system of claim 7, wherein said D/A converter includes first and second outputs, and said system further comprises second switching means for selectively connecting said first and second outputs to an analog signal output and a calibration output.

9. The system of claim 8, wherein said first switching means further comprises first and second multiplexers.

10. The system of claim 9, wherein said first and second multiplexers each include a transducer signal input and a plurality of calibration signal inputs.

11. The system of claim 10, wherein said plurality of calibration signal inputs comprise a transducer excitation signal input; a system output calibration input; and at least one reference voltage input.

12. The system of claim 11, further comprising a third switching means for selectively connecting said calibration output to said output calibration inputs of said first and second multiplexers.

13. The system of claim 5, further comprising:
   f) an A/D converter for receiving and digitizing amplified output signals from said first and second amplifiers, and outputting them to said digital signal processor.

14. The system of claim 13, wherein said first switching means further comprises first and second multiplexers.

15. The system of claim 14, wherein said first and second multiplexers each include a transducer signal input and a plurality of calibration signal inputs.

16. The system of claim 15, wherein said plurality of said calibration signal inputs comprise a transducer excitation signal input; a system output calibration input; and at least one reference voltage input.

17. The system of claim 1, wherein said first and second amplifiers are programmable gain amplifiers that are controllable by said means for controlling.

18. The system of claim 1, further comprising:
   f) first and second outputs;
   g) second switching means for selectively applying an amplified output signal or at least one calibration signal to either of said outputs, said second switching means being controlled by said means for controlling to apply an amplified output signal to one of said outputs while a calibration signal is applied to the other of said outputs.

19. The system of claim 1, further including:
   f) a transducer having an output connectable to said first or second input path by said first switching means;
   g) memory means integral with said transducer, said memory means containing transducer identification and calibration data; and h) means for connecting said memory means to said means for controlling to communicate said data to said means for controlling.

20. The system of claim 19, further comprising means for communicating data between an external operator-controlled data source, said means for controlling and said memory means, for enabling an operator to override data provided by said memory means and to retrieve identification and status information concerning said transducer.

21. The system of claim 20, wherein said data contained in said memory means further includes transducer excitation range data, transducer output signal filter set-up data and transducer output signal amplifier set-up data.

22. The system of claim 19, wherein said means for controlling includes filtering means, gain and offset compensation means, and linearization means for signals processed therethrough.

23. A method for calibrating a signal conditioning amplifier system comprising the steps of:

a) providing a signal amplifier system with first and second input signal paths, said first path having a first amplifier disposed therein, and said second path having a second amplifier disposed therein;

b) applying a signal to be amplified to said first amplifier to generate a first amplified signal;

c) simultaneously applying a calibration signal to said second amplifier;

d) calibrating said second amplifier in response to said calibration signal;

e) applying said signal to be amplified to said second amplifier to generate a second amplified signal;

f) applying a calibration signal to said first amplifier;

g) calibrating said first amplifier in response to said calibration signal; and h) repeating steps b)–g) to calibrate said first and second amplifiers repeatedly while a signal to be amplified is applied to one and/or the other of said first and second amplifiers.

24. The method of claim 23, further comprising the steps of simultaneously applying a signal to be amplified to both of said first and second amplifiers for a period of time between calibration of one of said first and second amplifiers, and the calibration of the other of said first and second amplifiers.

25. The method of claim 23, further comprising the steps of:

i) processing said first and second amplified signals generated by said first and second amplifiers to generate a processed signal; and j) outputting said processed signal.

26. The method of claim 25, wherein said step of outputting further comprises:

1) outputting said processed signal to a D/A converter having first and second outputs; and 2) applying said processed signal to one of said first and second outputs while the calibration signal is applied to the other of said first and second outputs.

27. The method of claim 25, wherein said step of processing further comprises inputting said first and second amplified signals to a digital signal processor, and processing said first and second amplified signals.

28. The method of claim 27, wherein said step of processing is implemented by said digital signal processor by performing filtering, gain and offset compensation and linearization operations on said first and second amplified signals.

29. The method of claim 27, wherein said steps of applying a signal to be amplified to said first and second amplifiers further comprise applying a transducer signal to said first and second amplifiers, and said method further comprises:

providing a transducer for generating said transducer signal;

providing a memory means integral with said transducer, said memory means containing transducer identification and calibration data; and communicating said data to said digital signal processor.

30. The method of claim 29, further comprising the step of causing said digital signal processor to calibrate said first and second amplifiers in response to said transducer identification and calibration data.

* * * * *